United States Patent [19]
Brady et al.

[11] Patent Number: 6,062,254
[45] Date of Patent: May 16, 2000

[54] MANIFOLD PROTECTIVE VALVE ENCLOSURE

[75] Inventors: Scott G. Brady; Paul E. Olson, both of Lexington, Ky.

[73] Assignee: The Rexroth Corporation, Lexington, Ky.

[21] Appl. No.: 09/067,481

[22] Filed: Apr. 27, 1998

[51] Int. Cl.$^7$ ..................................................... F16L 5/00
[52] U.S. Cl. .......................... 137/382; 137/377; 137/360; 137/347
[58] Field of Search .................................. 137/377, 382, 137/347, 360

[56] References Cited

U.S. PATENT DOCUMENTS

| | | | |
|---|---|---|---|
| 3,375,850 | 4/1968 | Aslan .................................... | 137/382 |
| 3,470,901 | 10/1969 | Nisley ................................... | 137/360 |
| 4,150,686 | 4/1979 | El Sherif et al. ..................... | 137/377 |
| 5,263,853 | 11/1993 | Pall ....................................... | 137/360 |
| 5,555,907 | 9/1996 | Philipp ................................. | 137/382 |

*Primary Examiner*—A. Michael Chambers
*Attorney, Agent, or Firm*—Buchanan Ingersoll, P.C.

[57] ABSTRACT

A manifold protective valve enclosure can have a bottom portion and a valve mounting subbase portion disposed on the bottom portion. A portion of the perimeter of the bottom portion can be surrounded by side walls which surround a valve which can be mounted on the subbase portion. A cover can be provided over the side walls to completely enclose and protect both the subbase and the valve. A portion of at least one side wall can form a side of the subbase, or integral conduit members can provide fluid communication between the side of the subbase and the side wall. The subbase can have the requisite ports configured to mate with the ports in the valve and can also have an override port configured to connect to an external device. The subbase can further include a receptacle for an electrical connector on the valve. The subbase can also include accessory devices such as mufflers, shut-off valves and flow controls. Passageways through the side walls can provide fluid communication between external connections and the subbase. Additionally, access holes through the side walls can provide access between an external electrical source and the receptacle on the valve subbase. The bottom portion can also have integral mounting portions configured to attach the manifold protective valve enclosure to a wall or other support surface.

41 Claims, 9 Drawing Sheets

MANIFOLD PROTECTIVE VALVE ENCLOSURE

FIELD OF THE INVENTION

This invention relates generally to a protective valve enclosure for a pneumatic valve, and more particularly, to a manifold protective valve enclosure having an integral valve mounting subbase onto which the valve can be removably mounted and all external plumbing and wiring for the valve can be directly connected to the manifold protective valve enclosure instead of the valve.

BACKGROUND OF THE INVENTION

Pneumatic directional control valves are commonly employed to control pressurized air to perform different tasks and operate various types of equipment. For example, in the railway transportation industry, such valves have been utilized to operate pneumatically controlled cargo doors on rail cars. Historically, such rail cars have been used to transport coal and other types of material. To unload the coal, the cargo doors of the rail cars were traditionally operated by hand. In recent times pneumatic valves have been employed to eliminate the need for workers to manually open and close the doors on each rail car.

In one conventional application, for example, equipment can be provided adjacent to the railway at the entry point of an unloading site where the cargo is to be discharged. This equipment can automatically activate the pneumatic valves, which are typically mounted on the outside of the rail car, to open the cargo doors of a rail car as it passes by. The cargo can then be emptied while the rail car is moving, usually at very slow speeds, such as two to three miles-per-hour. When the cargo has been emptied and as the rail car is leaving, wayside equipment positioned at an exit point of the unloading site can activate the pneumatic valves to close the cargo doors. This type of system employing pneumatic valves can permit the rail cars to unload the cargo without the train having to come to a complete stop. For safety reasons, the train can be required to come to a complete stop if it were required to have workers manually open and close the cargo doors.

Because such valves are normally mounted on the outside of rail cars there is a need for adequate protection from damage. Conventionally, a separate protective enclosure is designed, constructed and mounted over the valve to protect it from environmental conditions such as wind, rain, snow, dirt, and the like. Additionally, the valve needs to be protected from being struck by rocks or other foreign objects which a moving train might encounter. To provide sufficient protection the protective enclosure is normally constructed of sturdy steel plates which are welded together. The protective enclosure also has a latching cover which can be opened to provide access to the valve for repair or replacement.

The pneumatic valves are commonly installed by mounting the valve onto a valve mounting subbase which is secured to a base plate attached to the outside of the rail car. The valve can have a number of ports, for example, a "5 port-4 way" valve can have a supply port, two exhaust ports, and two delivery ports. Typically, the valve can require connection to a source of electricity. Consequently, a number of fittings, hoses and electrical wiring can be required to be routed to and operatively connected to the valve. Commonly, a valve mounting subbase is provided which has integral porting configured to mate with the ports on the valve and additionally has an electrical receptacle for an electrical connector on the valve. Thus, the requisite plumbing and wiring can be hard-plumbed and hard-wired directly to the subbase. The valve can then be conveniently connected to the subbase.

A protective enclosure is then constructed to completely enclose the valve and subbase. Conventionally, a cover can be provided to completely enclose and protect the valve. The cover commonly can be hinged at one side to permit it to be conveniently opened to easily access the valve for repair or replacement. The protective enclosure, including the cover, is typically constructed from steel to provide sufficient protection not only from the weather, but also to protect the valve from being struck by rocks or other debris that a moving train may encounter. Because of the plumbing and wiring requirements, the sides of the cover can be required to have cut out portions to provide access to the ports and electrical connections on the subbase.

In the rail car application described previously, and also in other different applications, a number of individually installed valves can be required, and a protective enclosure can be necessary for each of the valves. Consequently, a big disadvantage of conventional protective enclosures such as described above can be the expense and amount of time required to construct and mount a separate protective enclosure for each valve.

Thus, there is a need for a manifold protective valve enclosure which can have an integral valve mounting subbase portion on which a valve can be easily mounted and protectively enclosed by side walls and a cover. The integral subbase portion can have the requisite ports and electrical connections for connecting to the valve. Consequently, a valve, valve subbase and protective enclosure can be provided in a single, self contained, ready to install unit. The external plumbing and electrical connections can be routed through openings provided in the side walls and connected directly to the subbase portion. Thus, the valve can be easily connected or disconnected from the integral subbase portion without disturbing any external plumbing or wiring. Such a manifold protective valve enclosure can thereby eliminate the need for both a separate valve mounting subbase and a separate protective enclosure built around the subbase and the valve.

SUMMARY OF THE INVENTION

In accordance with the present invention, there is provided a manifold protective valve enclosure. The manifold protective valve enclosure can include a bottom portion and a valve mounting subbase portion disposed on the bottom portion. The bottom portion can also include integral mufflers, flow controls, shut off valves or other necessary items as may be required. The bottom portion can have one or more side walls around the subbase portion which can extend sufficiently to reach beyond the top of a valve which can be mounted on the subbase portion. An openable cover can preferably be provided to enclose the side walls and completely surround and protect both the subbase portion and a valve mounted thereon. Depending upon the number and height of the side walls around the bottom portion, the cover can have wall portions which can extend down to the bottom portion which can cooperate with the side walls to completely surround and protect the subbase portion and valve. A portion of the side walls can form opposing sides of the subbase portion or hollow conduits can be provided between the subbase and the side walls. The subbase portion can have the requisite ports configured to mate with the ports in the valve, override ports for testing and maintenance and can further include an electrical receptacle to receive an electrical connector on the valve. This electrical receptacle will be accessible for repair or replacement from the inside of the operable cover so that removal of hard plumbing and wiring of the protective valve enclosure will not be necessary if field repairs are needed. The side walls can have passageways to provide fluid communication between external plumbing and the ports in the valve subbase, either directly, or via the hollow conduits. Additionally, the side walls can have access holes for providing electrical communication between an external electrical source and the electrical receptacle on the valve subbase. Consequently, the manifold protective valve enclosure can be hard-plumbed and hard-wired at the externally accessible passageways and access holes such that no external sources need to be directly connected to the subbase portion or the valve. The cover can preferably be provided with a latch for securing the cover over the valve and subbase portion. The bottom portion can also include mounting portions which are configured to conveniently attach the manifold protective valve enclosure to a wall or other support surface.

Employing such a manifold protective valve enclosure, the valve can be preinstalled on the subbase portion inside the protective enclosure. The manifold protective valve enclosure can then be secured to the wall of a rail car as a single unit and all plumbing and wiring can be attached to externally accessible connections. Thus, there can be eliminated the need to first mount a valve subbase to the rail car, mount the valve on the subbase, wire and plumb the subbase, and, finally, construct a separate protective enclosure around the valve and subbase. As a result, installation can be simpler and faster—which can translate into less expense.

Other details, objects, and advantages of the invention will become apparent from the following accompanying drawings figures and detailed description of certain embodiments thereof.

BRIEF DESCRIPTION OF THE DRAWING FIGURES

A more complete understanding of the invention may be obtained by considering the following detailed description in conjunction with the accompanying drawings, in which:

FIG. 9b is a side view of the one piece electrical connector device shown in FIG. 9a.

DETAILED DESCRIPTION OF CERTAIN EMBODIMENTS

Figure 1:
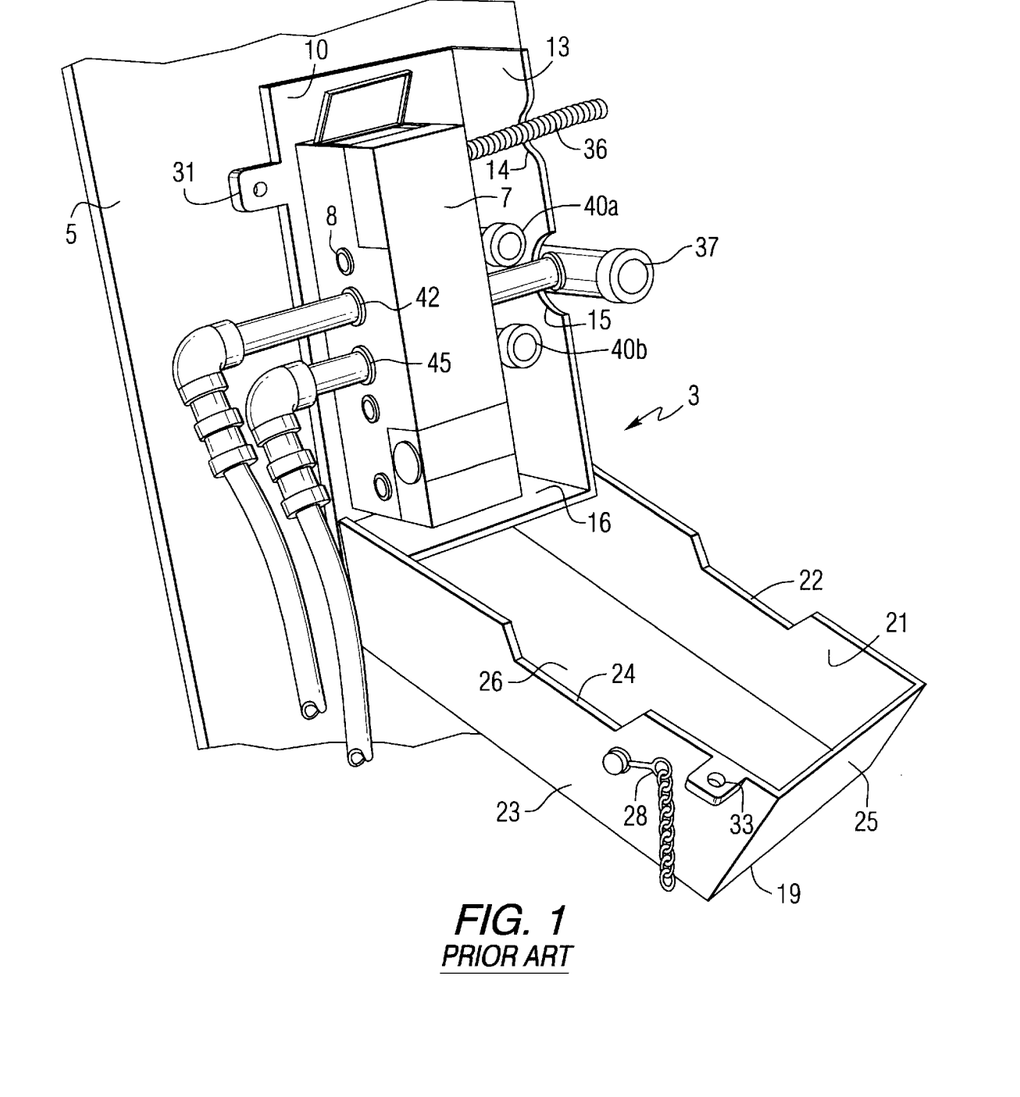
FIG. 1 is a perspective view of a prior art protective valve enclosure.

To aid in understanding the invention it will be helpful to first describe a prior art protective enclosure 3, as shown in FIG. 1. By way of example, what is commonly referred to as a "5-port-4-way" valve 7 is shown mounted on a valve subbase 8. A supply line 39 supplies pressurized air to the valve 7 through a supply port into the right side of the valve 7 as shown. A pair of elbow fittings 40a, 40b are shown connected to exhaust ports which are provided on either side of the supply port. However, instead of elbow fittings 40a, 40b, mufflers could be connected if requested by the customer. Two delivery ports 42, 45 are provided on the left side of the valve subbase 8 for pneumatically operating associated equipment connected by air lines plumbed to the valve subbase 8 as illustrated. The valve 7 can operate equipment by shifting pressurized air from one delivery port 42 to the other delivery port 45.

A conventional protective enclosure 3 is shown having a side wall 13 and an end wall 16 attached along the edges of the base plate 10 which is secured to the wall 5 of a rail car. The side wall 13 has cut out portions 14, 15 to provide access to a valve subbase 8 for electrical wiring 36 and supply line 37. The protective enclosure 3 also has a cover 19 having protective side walls 21, 23, 25 and top wall 26 to completely surround and protect the valve 7 and the subbase 8. The side walls 21, 23 of the cover 19, like the side wall 13, can require cut out portions 22 and 24 in each side to provide access to the valve subbase 8 for the requisite plumbing to the delivery ports 42, 45, the supply line 39 and the electrical wiring 36. As can clearly be seen, the valve subbase 8 is a separate and distinct component. Specifically, no portion of any of the side walls 13, end wall 16 or side walls 19, 21, 25 of the cover 19 form sides of the valve subbase 8.

To install the valve 7 and protective enclosure in a conventional manner, the valve subbase 8 can be mounted on a base plate 10 which is secured to a support wall 5 of, for example, a rail car. The valve 7 can then be mounted on the valve subbase 8. The requisite plumbing and electrical wiring can be routed and connected to the valve subbase 8. Then, the protective enclosure 3 can be designed and constructed to attach to the base plate 10 and totally enclose the valve 7 and subbase 8. The protective enclosure 3 can commonly be attached to the base plate 10 in a manner which permits it to swing open to access the enclosed valve 7 for repair or replacement. The base plate 10 and cover 19 can each have tabs 31, 33 which can have holes therein that align when the cover 19 is closed. A latch 28 can be included having a portion which passes through the holes in the tabs 31, 33 to hold the tabs together and thereby prevent the cover 19 from inadvertently opening. Because the valve 7 is conventionally mounted on an exposed exterior surface of a rail car, for example, the protective enclosure 3 is typically constructed of a sturdy material, such as steel plate, to adequately protect the valve from environmental conditions and also from being struck by any debris which a moving train may encounter. It normally can be required that a separate such protective enclosure 3 be individually constructed to protectively enclose each valve 7.

Figure 2:
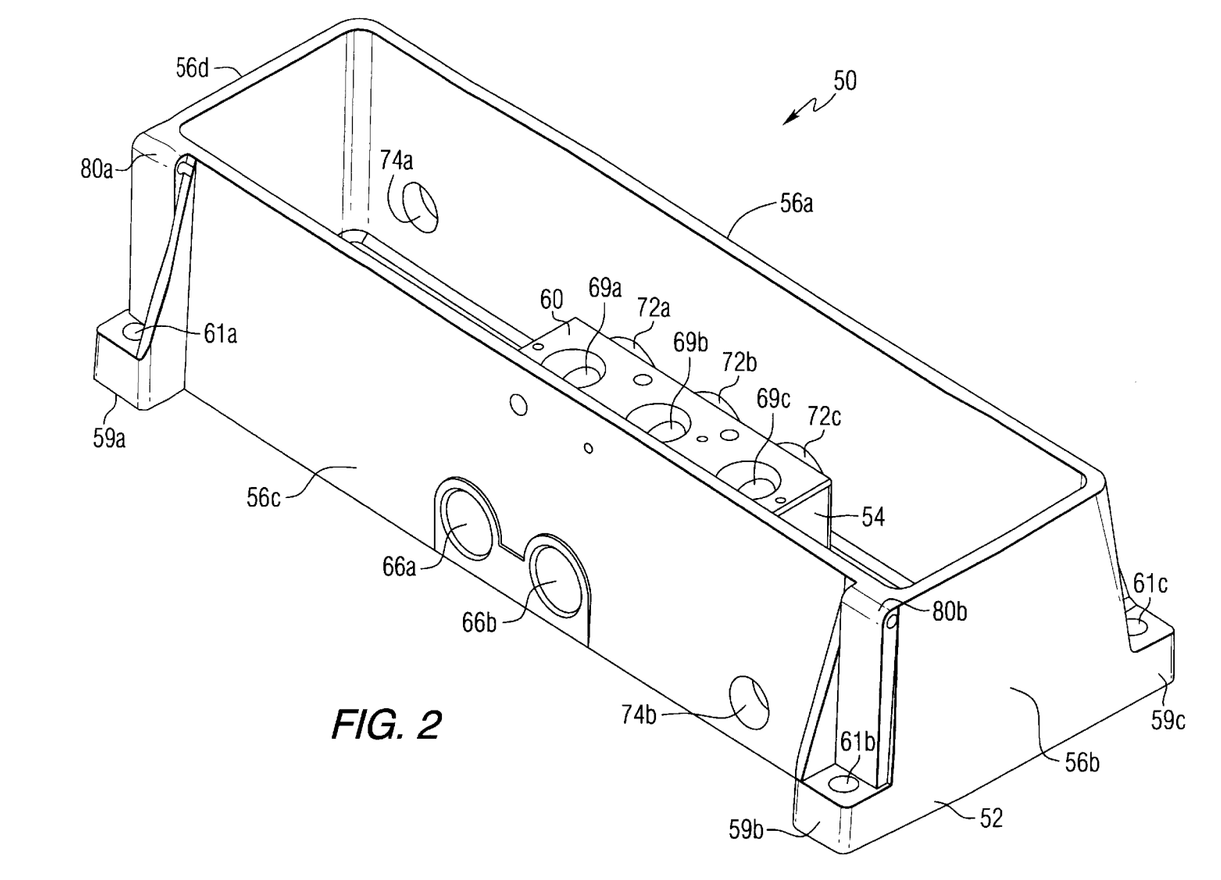
FIG. 2 is a perspective view of an embodiment of a manifold protective valve enclosure.
Figure 3:
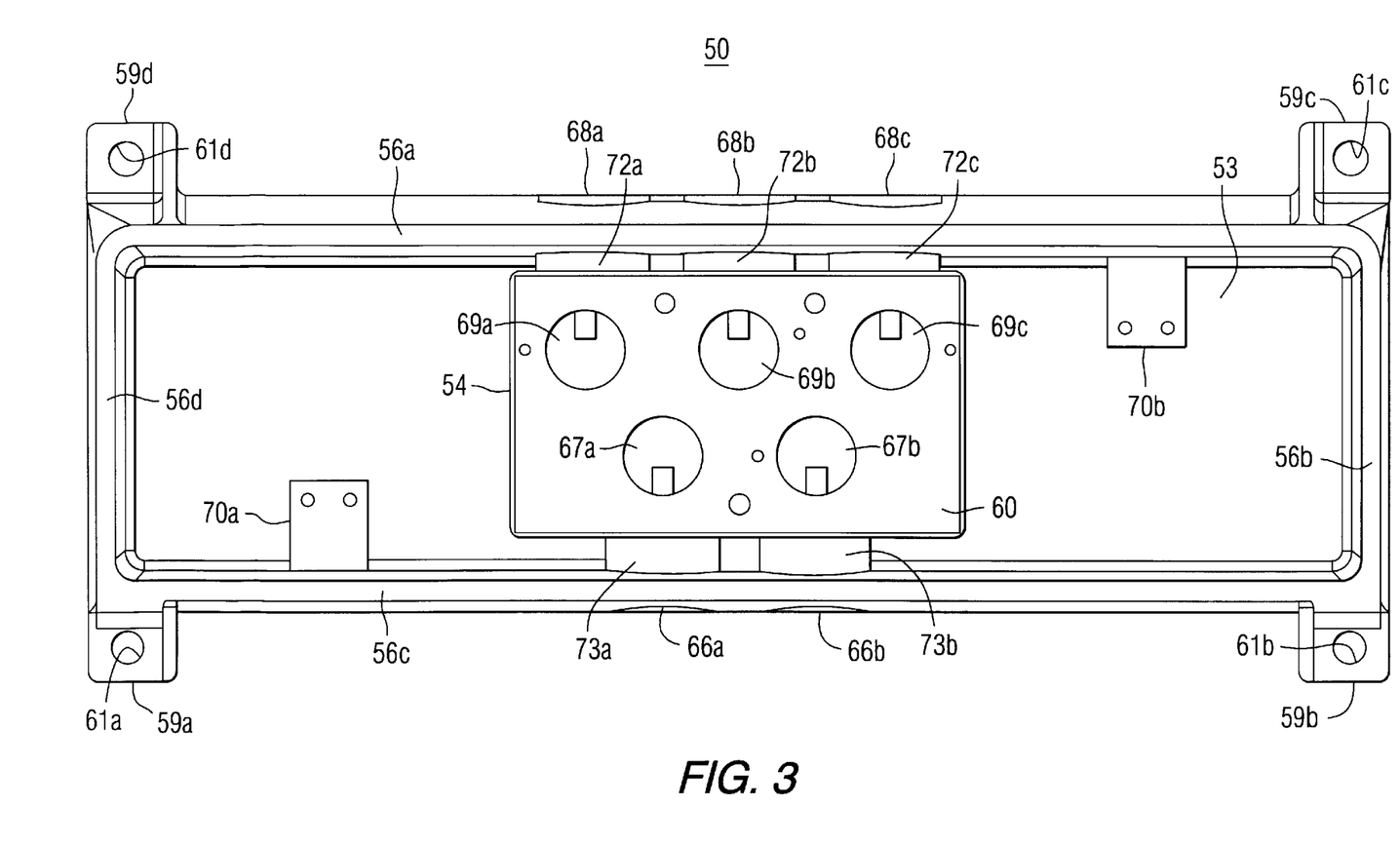
FIG. 3 is a top plan view of the valve enclosure of FIG. 2.
Figure 4:
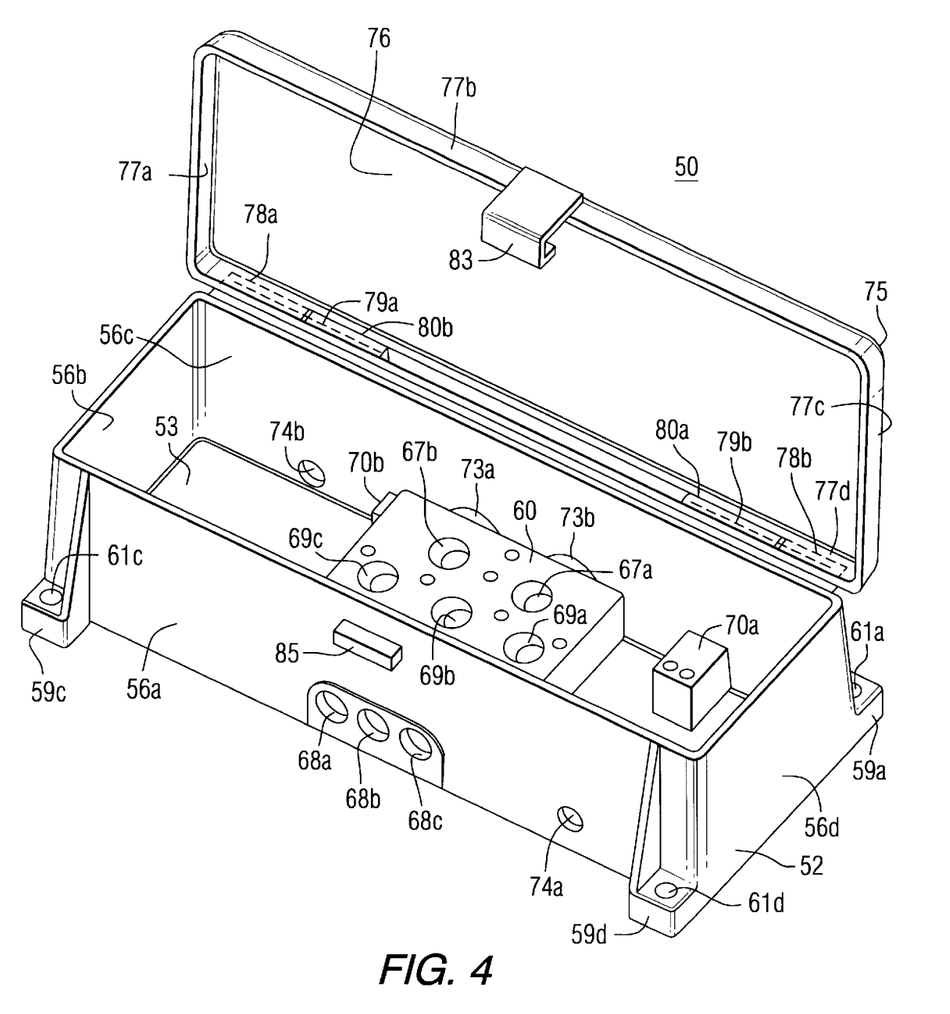
FIG. 4 is a perspective view of the opposite side of the manifold protective valve enclosure of FIG. 2 including a cover and a latch.

Referring now to FIGS. 2–4, an embodiment of a manifold protective valve enclosure 50 is shown having a generally rectangular shape with a bottom portion 52 and side walls 56a–56d extending around the entire perimeter of the bottom portion 52 and forming an enclosure accessible in main part only from above the side walls 56a–56d.

Preferably, a cover 76 can be provided over the side walls 56a–56d to completely surround and enclose the area within the side walls 56a–56d to fully protect a valve 7 (as shown in FIG. 1) which can be mounted within such enclosed area. The bottom portion 52 can have mounting portions 59a–59d, which can be integrally formed, for attaching the manifold protective valve enclosure 50 to a support surface, such as, for example, a wall 5 of a rail car (as shown in FIG. 1). A hole 61a–61d can be provided through each of the mounting portions 59a–59d for securing, for example by bolts or screws, the bottom portion 52 to a support surface. Alternatively, the bottom portion 52 can be welded or otherwise securely attached to an appropriate support surface.

A valve mounting subbase portion 54 can preferably be disposed on an upper surface 53 of the bottom portion 52 within the side walls 56a–56d. Preferably, a portion of one or more side walls 56a, 56c can form a side of the subbase portion 54. As shown in the embodiment of FIG. 3, for example, the sides of the subbase portion 54 can have projecting conduit portions 72a–72c, 73a–73b which can preferably be integrally formed between the subbase portion 54 and the side walls 56a–56d. Alternatively, as shown in FIGS. 5–8, one, or both, sides of the subbase portion 54 may be an integral portion of the side walls 56a, 56c such that the conduit portions 72a–72c, 73a–73b are not needed. The side walls 56a, 56c can be provided with the requisite passageways, for example, passageways 66a–66b, 68a–68c, for providing fluid access, via conduit portions 73a–73b, 72a–72c, between the valve subbase 54 and external plumbing. Preferably, the subbase portion 54 can also be an integrally formed raised portion of the upper surface 53 of the bottom portion 52. The subbase portion 54 can be provided with, for example, multiple ports 67a, 67b, 69a, 69b, 69c (shown best in FIG. 3) which can be configured to align with mating ports on the valve 7. The valve 7 can be mounted on a valve interface surface 60 provided on the subbase portion 54. The passageways 66a, 66b and 68a–68c in the side walls 56a, 56c can each have an inner opening in fluid communication with the ports in the subbase portion 54 and an externally accessible outer opening. The outer openings can preferably be configured to easily interface with external plumbing. Additionally, it may be desirable to provide a gasket (not shown) between the interface surface 60 and the valve 7 for a good seal. In a 5 port-4 way valve, for example, as shown in FIG. 2, ports 67a and 67b can be delivery ports and port 69b can be a supply port. Ports 69a and 69c can be exhaust ports. Additional ports, or fewer ports, could be provided depending on the application. The subbase portion 54 can also be provided with electrical terminals 70a, 70b for connection to an external electrical source. Although two electrical terminals 70a, 70b are shown in FIG. 3, a single terminal, or additional terminals, could be provided.

The side walls 56a–56d can preferably extend beyond the top of the valve 7 when the valve 7 is mounted on interface surface 60 of the valve subbase portion 54. Side wall 56c can, for example, have passageways 66a, 66b, for providing fluid communication between the subbase portion 54 delivery ports 67a, 67b and an external device via plumbing, similarly to that shown in FIG. 1. Likewise, side wall 56a can, for example, have passageways 68a, 68c for providing external access to the exhaust ports 69a, 69c, for example to receive mufflers, and a passageway 68b for providing fluid communication between the supply port 69b and an external supply source. Additionally, access holes 74a, 74b can be formed in the side walls 56a–56d to provide access for external electrical wiring to the electrical terminals 70a, 70b on the subbase portion 54. Thus, all external plumbing and wiring can be hard-plumbed and hard-wired directly to the side walls 56a and 56c via the passageways 66a, 66b, 68a–68c and the access holes 74a, 74b. Consequently, no external plumbing or wiring need be directly connected to the valve 7 or valve subbase portion 54. As with the ports, the number of passageways and access holes can vary depending on the application. Conveniently, externally accessible ends of the passageways 66a, 66b, 68a–68c can be internally threaded or otherwise pre-configured to be more quickly and easily connected to and disconnected from external plumbing.

To provide full protection, a cover 75, shown in FIG. 4, can preferably be provided to completely enclose a valve 7 mounted on the subbase portion 54 within the side walls 56a–56d. The cover 75 can include a top plate 76 and downward extending lip members 77a–77d. These lip members 77a–77d can be made longer if desired. For example, if the side walls 56a–56d were desired to be made shorter the lip members 77a–77d could be made longer to maintain complete enclosure around the subbase portion 54 and any valve 7 mounted thereon. The cover 75 can be designed so as to be openable, or removable, to permit access to the valve 7 in the event repair or replacement becomes necessary. One manner of making the cover 75 openable, for example, is to provide one edge of the cover 75 with hinge portions 78a, 78b and employ hinge pins 79a, 79b for operatively connecting to hinge portions 80a, 80b which can be provided on one of the side walls 56d, for example. Thus, the cover 75 can be opened about the hinged side. The cover 75 can also include a latch portion 83 on a side of the cover 75 opposite the hinged side to hold the cover 75 closed and prevent it from opening inadvertently. A catch 85 portion can be provided on a side wall, 56a for example, which is opposite the hinged side of the cover 75 for the latch portion 83 to mate with to hold the cover 75 closed. Alternatively, various other well known means of latching the cover 75 could be provided.

Figure 5:
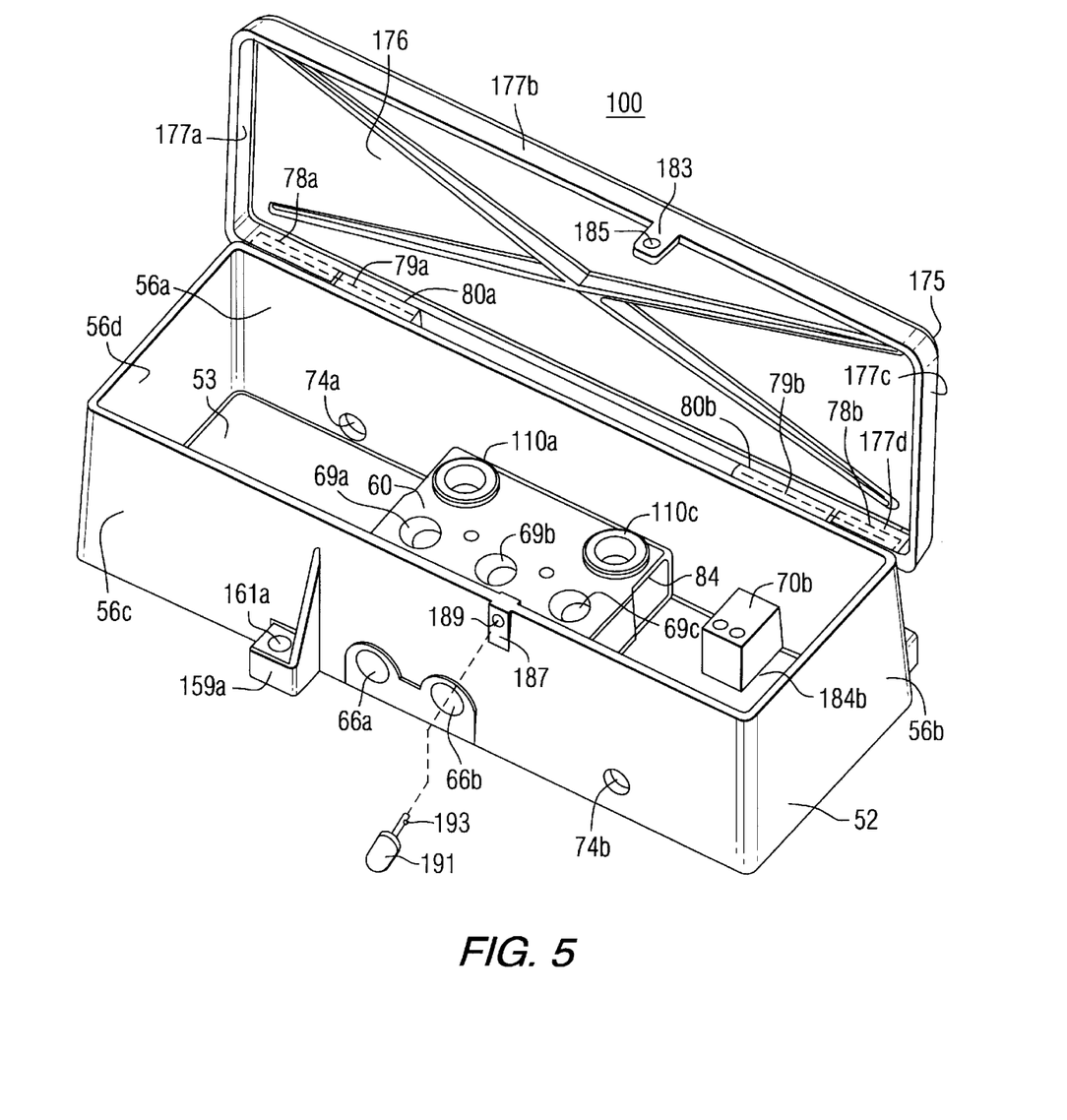
FIG. 5 is a perspective view of another embodiment of a manifold protective valve enclosure including a cover and a latch.
Figure 6:
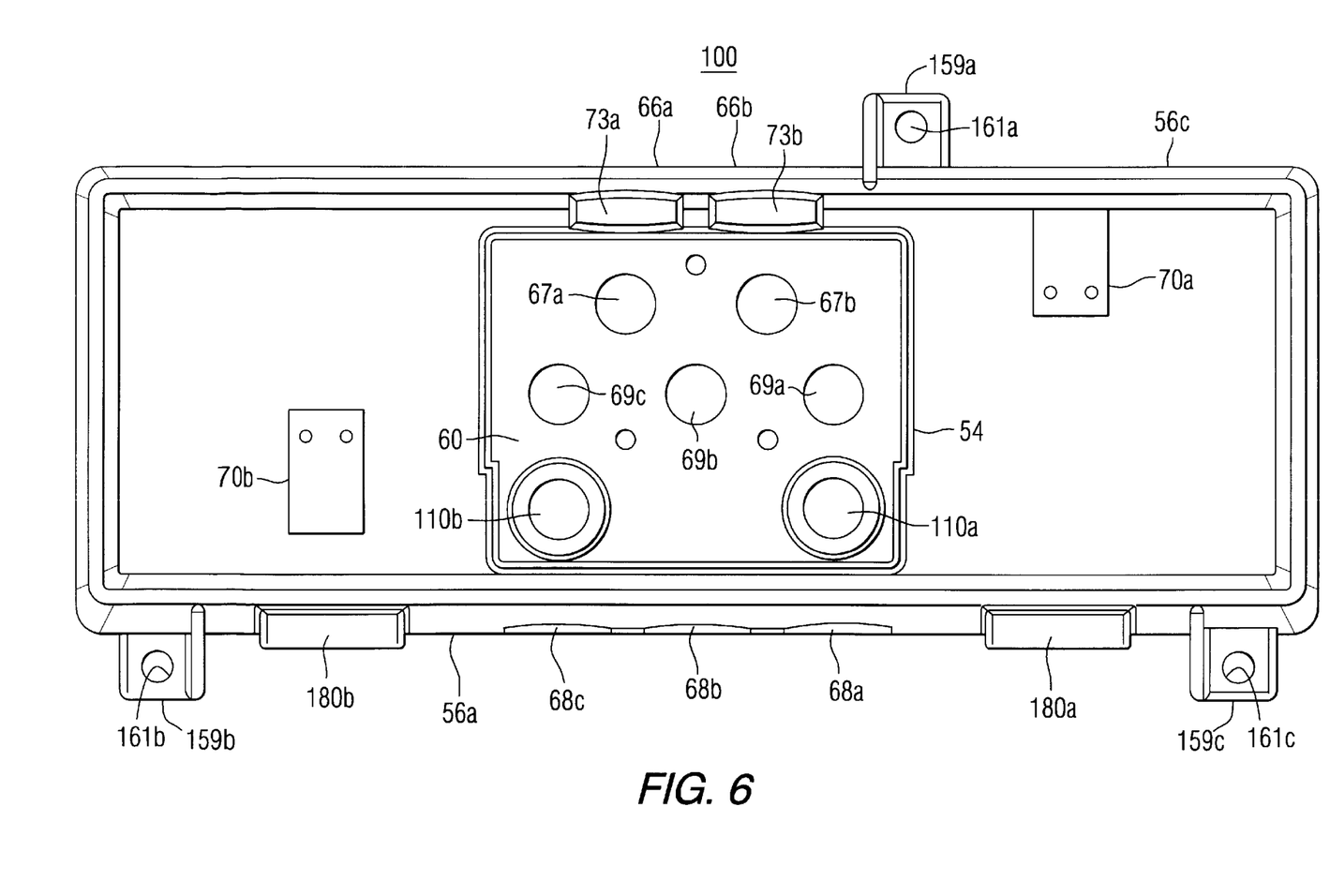
FIG. 6 is a top plan view of the manifold protective valve enclosure of FIG. 5 with the cover removed.

Another embodiment of a manifold protective valve enclosure 100 is illustrated in FIGS. 5 and 6 wherein elements common to the previous embodiment of the manifold protective valve enclosure 50 are similarly numbered and new elements are uniquely numbered. The subbase portion 54 and, if needed, the protective valve enclosure 100, can be made wider to accommodate two additional ports 110a, 110c which can preferably be accessible to external plumbing without removing the valve from the subbase portion 54. These added ports 110a, 110c can, for example, be exhaust override ports in fluid communication with exhaust ports 69a, 69c, respectively of the subbase portion 54. These override ports 110a, 110c can preferably be preconfigured to quickly connect to and disconnect from external connections so that the user can conveniently connect to the override ports 110a, 110c for testing or maintenance purposes. The override ports 110a, 110c permit the user to bypass the primary exhaust ports 68a, 68c in order to apply external pressure through the valve when the normal supply air is not available. One side of the subbase portion 54 of the valve enclosure 100, as shown in FIG. 6, can be formed by a portion of a side wall 56a such that no conduit portions 72a–72c, as shown in FIG. 3, need be provided on that side. The opposite side of the subbase portion 54 is shown having conduits 73a–73b but, alternatively, that side could also be formed by a side wall 56c. An alternative type of cover 175 can be provided having a different type of latch 183. The cover 175 can have a top plane 176 and downward extending lip members 177*a*–177*d*. Correspondingly, the side wall 56*c* can include a different type of catch member 187 to retain the latch 183 on the cover 175. Latch member 183 has a hole 185 which aligns with a hole 189 in the catch member 187. A pin 191 with a spring plunger ball 193 can be provided which can be removably inserted through both holes 185, 189 which are aligned when the cover 175 is closed. To open the cover 175 the pin 191 is removed. The cover 175 can also be hinged to the side wall 56*a* at the exhaust side of the subbase portion 54 instead to the side wall 56*c* at the supply side of the subbase portion 54 as with the cover 75 shown in FIG. 4. Further, it is to be understood that to any of the illustrated embodiments of the manifold protective valve enclosure, suitable modifications could be made such that any of the covers employed could be hinged, or otherwise removably attached, along the short side of the manifold protective valve enclosure instead of the long side as illustrated. Additionally, the bottom portion can have differently positioned mounting portions 159*a*–159*c* wherein two such mounting portions 159*b*, 159*c* can be located near opposite corners of one side wall 56*c* of the protective enclosure 100 and a single mounting portion 159*a* can be located near the middle of an opposite side wall 56*a*. The mounting portion 159*a*–159*c* can include mounting holes 161*a*–161*c* and can be mounted on a support surface similarly to the manner described previously in connection with the description of mounting portions 59*a*–59*d*. In other respects, the manifold protective valve enclosure 100 can be the same as the manifold protective valve enclosure 50 shown in FIGS. 2–4.

Figure 7:
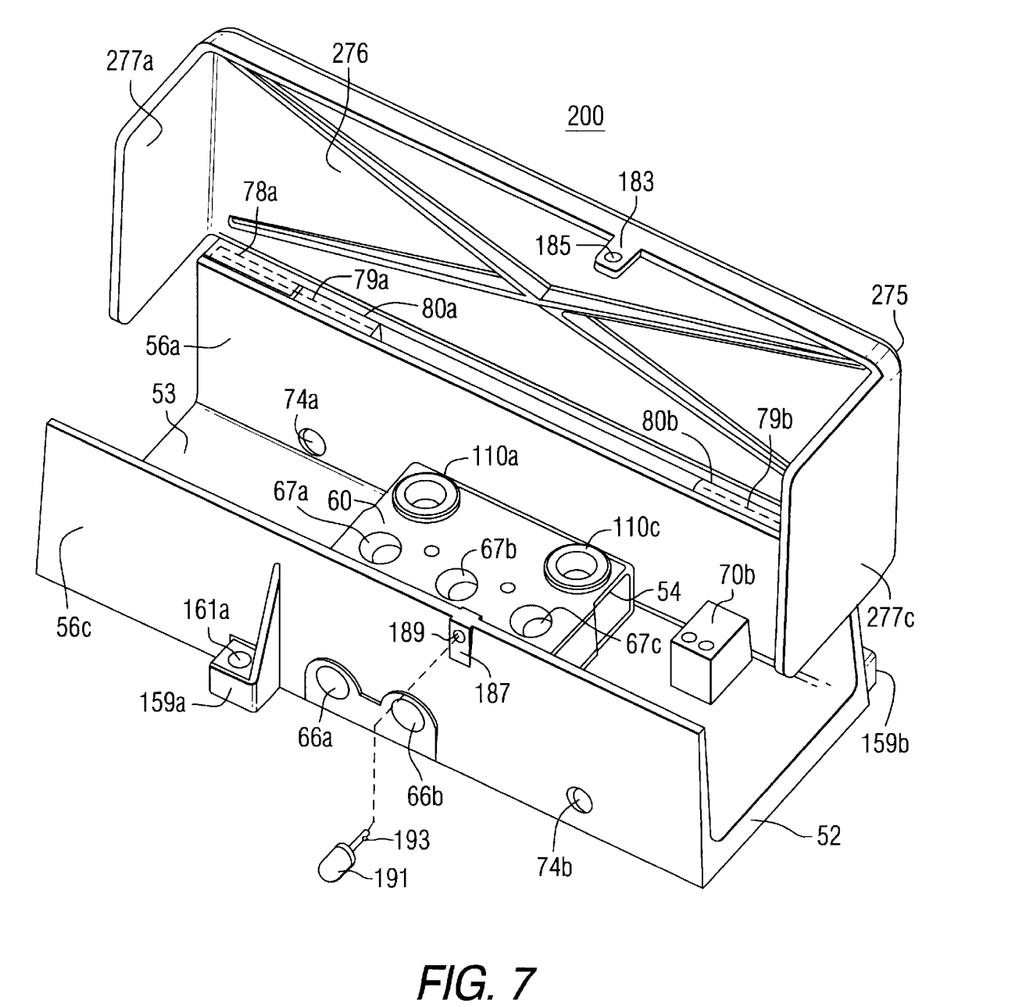
FIG. 7 is a perspective view of another embodiment of a manifold protective valve enclosure including a cover and a latch.

In another embodiment, shown in FIG. 7, the manifold protective valve enclosure 200 can be channel shaped, having only a pair of opposing side walls 56*a*, 56*c*, a portion of which form opposing sides of the valve subbase portion 54. As described previously, either or both sides of the subbase portion 54 can be formed by a side wall 56*a*, 56*c* or may have the conduit portions as described previously in connection with FIG. 6. An alternatively configured cover 275 can be provided having a top plate 276 and end walls 277*a*, 277*c* which can extend substantially downwards to the bottom portion 52 when the cover is closed over the manifold protective valve enclosure 200. Thus, the side walls 56*a*, 56*c* in conjunction with the end walls 277*a*, 277*c* completely surround and protect the subbase 54 and a valve which can be mounted thereon. In other respects, the manifold protective valve enclosure 200 can be like the foregoing embodiments. Thus, all external plumbing and electrical wiring can be hard plumbed and hard wired to the side walls 56*a*, 56*c* such that no plumbing or wiring need be connected directly to the valve subbase portion 54 or the valve 7.

Figure 8:
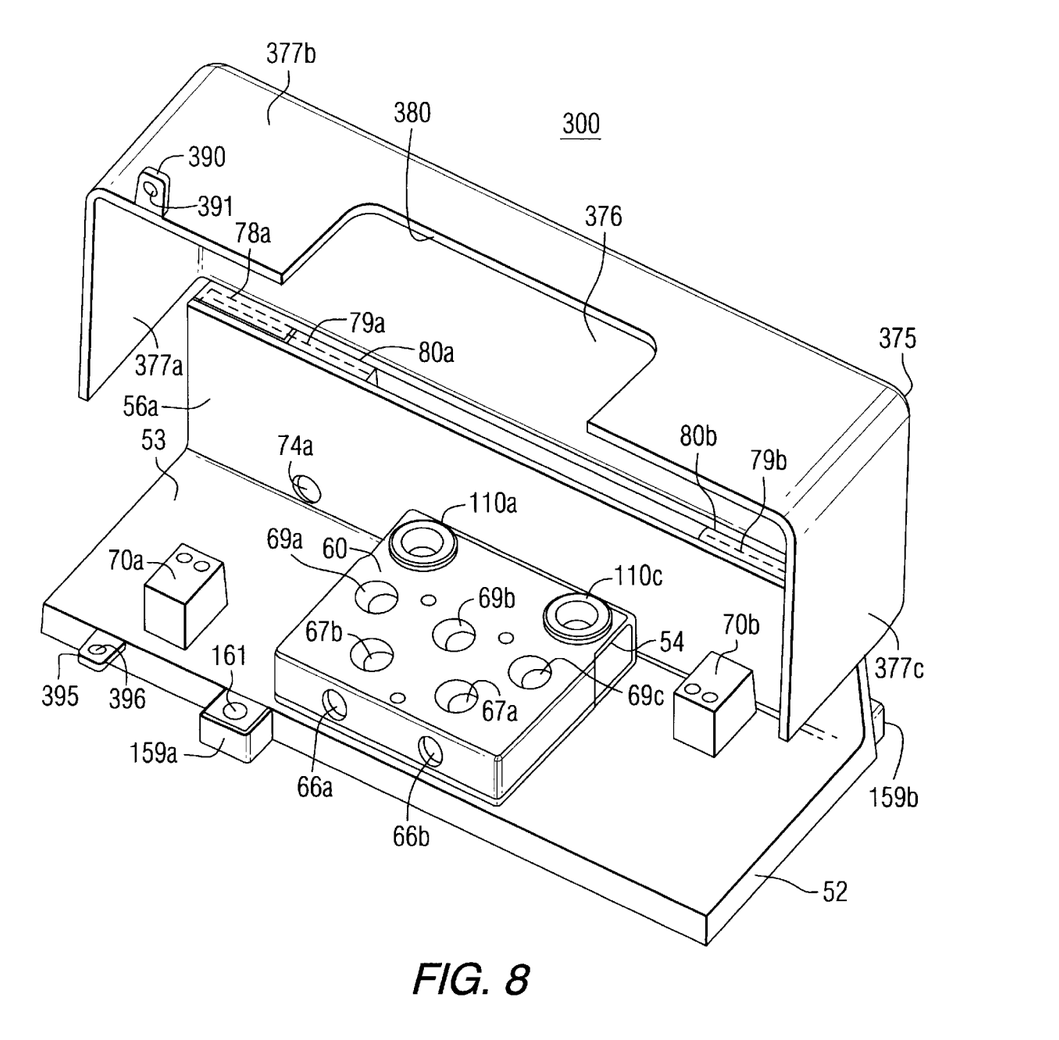
FIG. 8 is a perspective view of another embodiment of a manifold protective valve enclosure including a cover and a latch.
Figure 9A:
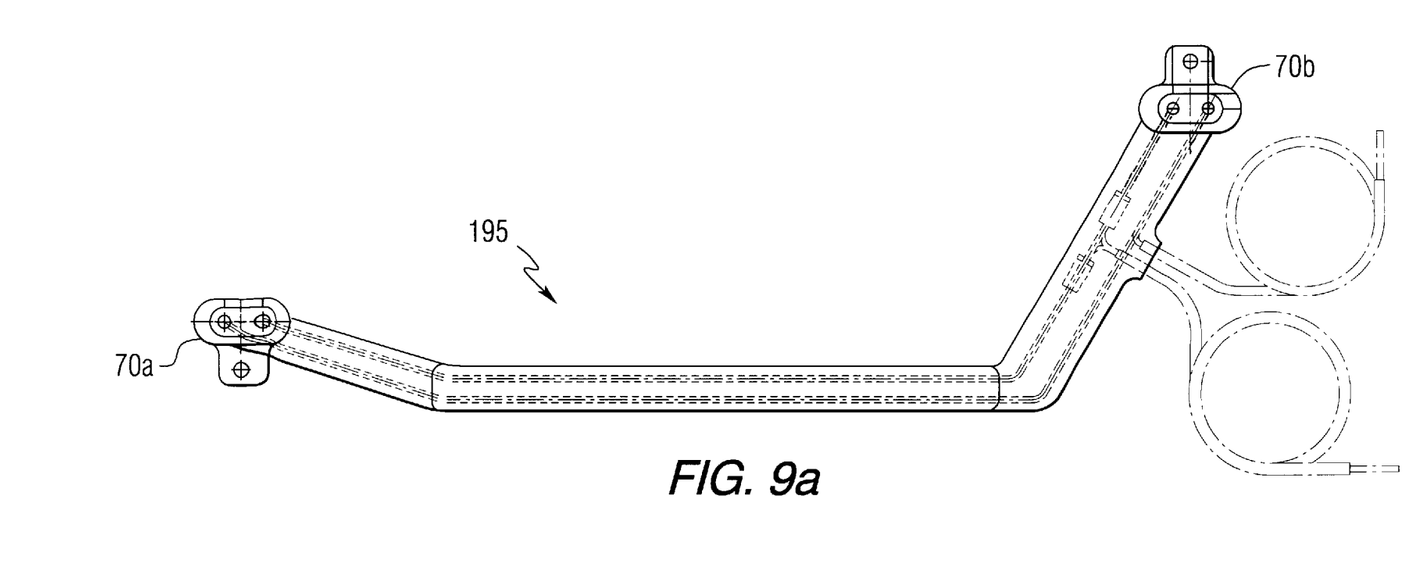
FIG. 9a is a top plan view of a one piece electrical connector device.
Figure 9B:
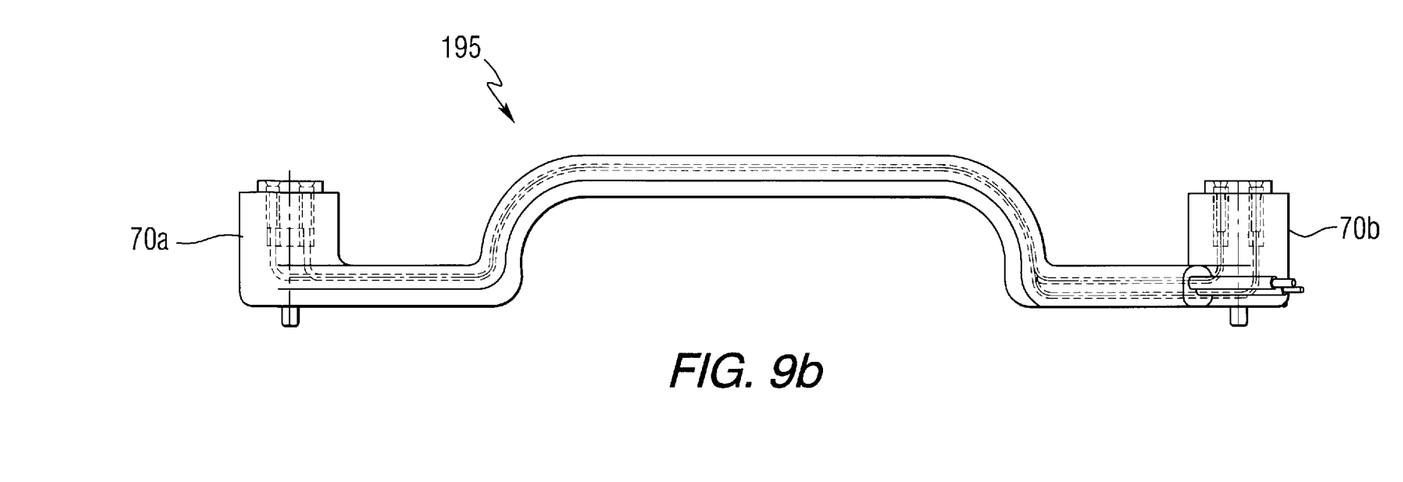

In a further embodiment, shown in FIG. 8, the manifold protective valve enclosure 300 can be similar to the manifold protective valve enclosure 200 except that only a single side wall 56*a* extends from the bottom portion 52. A portion of the side wall 56*a* forms one side of the subbase portion 54. Alternatively, the subbase can have conduit portions as described above. A cover 375 is provided having a top plate 376 and end walls 377*a*, 377*c* which can extend substantially downwards to the bottom portion 52 similarly to the cover 275 in FIG. 7. Additionally, however, the cover 375 can have a front wall 377*b* which also extends substantially downwards towards the bottom portion 52. The cover side wall 377*b* can have a cut out portion 380 to provide the requisite access to the ports, for example ports 66*a*, 66*b*, on the side of the subbase portion 54 which is not enclosed by a side wall. Thus, the two end walls 377*a*, 377*c*, top plate 376 and the front wall 377*b* cooperate with the single side wall 56*a* of the valve enclosure 300 to completely surround and protect the valve subbase portion 54 and a valve 7 mounted thereon. A latch 390 on the cover 375 and a catch 395 on the bottom portion 52, for example, can be provided to retain the cover 375 closed against the bottom portion 52. Holes 391, 396 can be provided through the latch 390 and catch 396 for inserting therethrough, for example, a lock or other device to lock the cover 375 closed. It is to be understood that the side wall 56*a*, shown on the supply port 69*b* side of the subbase portion 54 could alternatively be a side wall 56*d* on the delivery port 66*a*, 66*b* side of the subbase portion 54. In which case the cover 375 would be reversed. In this embodiment, only one side of the subbase portion 54 is formed by a portion of a side wall. Consequently, the opposite side of the subbase portion can require being externally plumbed. In other respects, the manifold protective valve enclosure can be generally the same as the previously disclosed embodiments. The manifold protective valve enclosure 300 may be preferable if greater unobstructed access to the valve 7 or valve subbase portion 54 is desired. A one-piece electrical connector device 195, shown in FIG. 9, can preferably be mounted on the bottom portion to which an external electrical source can be connected via one of the access holes 74*a*, 74*b*. The one-piece electrical connector device 195 can preferably incorporate all of the wiring and plug-ins needed to connect any solenoids and to provide any internal electrical protection or signaling desired. The one-piece electrical connector device 199 can include the electrical terminals 70*a*, 70*b* and will be rigidly attached to the subbase portion 54. Consequently, the electrical connectors on the valve can simply be plugged into the subbase portion 54. Such one-piece electrical connector devices are well known to those skilled in the art. An example of such a one-piece electrical connector device is described in *International Standard,* Reference No. ISO 5599-2: 1990 (E).

Depending on the application for the valve 7, and the preference of the customer, various accessory items such as mufflers, flow controls, pressure regulators, shut-off valves, and the like can be incorporated into the manifold protective enclosure or subbase portion. Thus, a valve 7, valve subbase 54 and manifold protective enclosure 50, and any preferred accessories, can be provided preassembled in a single, completely self contained unit ready to be mounted wherever it is needed. Optionally, the manifold protective valve enclosure 50, with any preferred accessories preinstalled, can be provided without the valve 7 so that a customer can add a selected valve at a later date by simply mounting it on the valve interface surface 60 of the subbase portion 54.

In operation, the valve 7 can be electrically controlled to pneumatically operate, for example, a cargo door on a rail car to unload cargo transported by the rail car. Pressurized air from an external supply source can be supplied to the valve 7 via a passageway 68*b* in the side wall 56*a* and port 69*b* in the subbase portion 54 which mates with an corresponding port in the valve 7. The valve 7 can be electrically actuated by an external controller which can be electrically connected to the valve via an electrical connection to the valve subbase 54 which itself can be wired, preferably, to an electrical connector device carried in a side wall 56*a*, 56*c* in one of the access holes 74*a*, 74*b*. The controller can likewise be electrically connected to the valve via the electrical connector device. The valve can be actuated by the controller to, for example, deliver pressurized air through a first delivery port 66*a* which can cause the cargo door to open to discharge the cargo. Subsequently, the valve 7 can be actuated to shift delivery of the pressurized air to another delivery port 66b which can cause the cargo door to close. It is to be understood that the application just described is only an example of one application and that a manifold protective valve enclosure as described herein can be utilized in other applications for pneumatic valves where such protection may be needed or desirable.

Furthermore, although certain embodiments of the invention have been described in detail, it will be appreciated by those skilled in the art that various modification to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A manifold protective valve enclosure comprising:
    a. a bottom portion;
    b. a subbase portion disposed on said bottom portion and having at least one port and an upper surface for mounting a valve thereon and said at least one port for mating with a corresponding valve port on said valve;
    c. at least one side wall disposed along an edge of said bottom portion and at least a portion of said at least one side wall forming a side of said subbase portion; and
    d. at least one passageway through said at least one side wall in fluid communication with said at least one port.

2. The manifold protective valve enclosure of claim 1 further comprising a cover having a lid portion sized to cover and enclose said subbase portion within said at least one side wall.

3. The manifold protective valve enclosure of claim 2 wherein said cover further comprises side portions extending generally perpendicularly from said lid portion.

4. The manifold protective valve enclosure of claim 3 wherein at least one of said side portions extends substantially to said bottom portion and surrounds said subbase portion on at least one side thereof.

5. The manifold protective valve enclosure of claim 4 further comprising at least one of said side portions having a cut out area for providing external access to said subbase portion.

6. The manifold protective valve enclosure of claim 4 wherein a plurality of said side portions each extend substantially to said bottom portion and surround said subbase portion on a plurality of sides thereof.

7. The valve enclosure of claim 1 wherein:
    a. said at least one side wall comprises a pair of side walls each disposed along opposing edges of said bottom portion and at least a portion of each of said pair of side walls forming a side of said subbase portion;
    b. said at least one port comprises at least two ports each having a first opening for mating with corresponding valve ports on said valve; and
    c. at least one passageway through each of said pair of side walls, each said passageway in fluid communication with one of said at least two ports.

8. The valve enclosure of claim 1 wherein:
    a. said at least one side wall comprises a plurality of side walls disposed around said bottom portion and surrounding said subbase portion on a plurality of sides;
    b. at least one of said plurality of side walls forming a side of said subbase portion; and
    c. at least one passageway through at least one of said plurality of side walls and said at least one passageway in fluid communication said at least one port.

9. The valve enclosure of claim 1 further comprising:
    a. at least one hollow conduit disposed between said at least one side wall and a side of said subbase portion and said conduit in fluid communication with said at least one port; and
    b. said at least one passageway in fluid communication said at least one conduit.

10. The manifold protective valve enclosure of claim 1 wherein said subbase portion comprises an integrally formed raised portion of said bottom portion.

11. The manifold protective valve enclosure of claim 1 wherein said at least one side wall extends beyond said upper surface and extends beyond said valve when mounted thereon.

12. The manifold protective valve enclosure of claim 2 further comprising a hinge between an edge of said cover and said at least one side wall such that said cover is movable between opened and closed positions.

13. The manifold protective valve enclosure of claim 1 further comprising at least one access hole through said at least one side wall for providing electrical access between an electrical connector associated with said valve and an external electrical source.

14. The manifold protective valve enclosure of claim 13 further comprising said subbase portion having at least one electrical receptacle to receive an electrical connector associated with said valve and said at least one access hole providing electrical access between said electrical receptacle and said external electrical source.

15. The manifold protective valve enclosure of claim 13 further comprising a one-piece electrical connector device mounted on said bottom portion within said plurality of side walls and electrically connected to said at least one electrical receptacle and said at least one access hole providing access between an external electrical source and said one-piece electrical connector device.

16. The manifold protective valve enclosure of claim 15 wherein said one-piece electrical connector is accessible from inside said plurality of side walls.

17. The manifold protective valve enclosure of claim 1 wherein:
    said at least one port comprises a plurality of ports each for mating with corresponding valve ports on said valve; and
    said at least one passageway is a plurality of passageways each and an inner opening in fluid communication with one of said plurality of ports.

18. The manifold protective valve enclosure of claim 17 further comprising at least one override port in fluid communication with at least one of said plurality of ports and one override port spaced apart from said plurality of ports such that said override port is accessible to an external connection even with said valve mounted on said upper surface.

19. The manifold protective valve enclosure of claim 17 wherein said plurality of ports comprises at least one supply port and at least one delivery port and at least one exhaust port.

20. The manifold protective valve enclosure of claim 18 wherein at least one of said plurality of ports is an exhaust port and said at least one override port is in fluid communication with said exhaust port.

21. The manifold protective valve enclosure of claim 1 further comprising at least one accessory device connected to at least one of said subbase portion and said bottom portion within said at least one side wall.

22. A manifold protective valve enclosure comprising:
a. a bottom portion;
b. at least one side wall disposed along an edge of said bottom portion;
c. a subbase portion disposed on said bottom portion and having at least one port and an upper surface for mounting a valve thereon and said at least one port for mating with a corresponding valve port on said valve;
d. at least one hollow conduit interposed between a side of said subbase portion and said at least one side wall and said hollow conduit in fluid communication with said at least one port; and
e. at least one passageway through said at least one side wall and in fluid communication said hollow conduit.

23. The manifold protective valve enclosure of claim 22 further comprising a cover having a lid portion sized to cover and enclose said subbase portion within said at least one side wall.

24. The manifold protective valve enclosure of claim 23 wherein said cover further comprises side portions extending generally perpendicularly from said lid portion.

25. The manifold protective valve enclosure of claim 24 wherein at least one of said side portions extends substantially to said bottom portion and surrounds said subbase portion on at least one side thereof.

26. The manifold protective valve enclosure of claim 25 further comprising at least one of said side portions having a cut out area for providing external access to said subbase portion.

27. The manifold protective valve enclosure of claim 25 wherein a plurality of said side portions each extend substantially to said bottom portion and surround said subbase portion on a plurality of sides thereof.

28. The valve enclosure of claim 22 wherein:
a. said at least one side wall comprises a pair of side walls each disposed along opposing edges of said bottom portion;
b. said at least one port comprises at least two ports each for mating with corresponding valve port on said valve;
c. said at least one hollow conduit comprises at least two hollow conduits disposed between each of said pair of side walls and opposing sides of said subbase portion and each said hollow conduit in fluid communication with one of each of said at least two ports; and
d. said at least one passageway comprises at least one passageway through each of said pair of side walls and each passageway in fluid communication with one of said at least two hollow conduits.

29. The valve enclosure of claim 22 wherein:
a. said at least one side wall comprises a plurality of side walls disposed around said bottom portion and surrounding said subbase portion on a plurality of sides;
b. said at least one port comprises a plurality of ports for mating with corresponding valve ports on said valve;
c. said at least one hollow conduit comprises a plurality of hollow conduits disposed between each of said pair of side walls and opposing sides of said subbase portion and each said hollow conduit in fluid communication with one of said plurality of ports; and
d. said at least one passageway comprises a plurality of passageways through said plurality of side walls and each passageway in fluid communication with one of said plurality of hollow conduits.

30. The valve enclosure of claim 22 wherein:
a. said at least one side wall comprises a pair of side walls with one side wall disposed along opposing edges of said bottom portion;
b. said at least one port comprises at least two ports for mating with corresponding valve ports on said valve;
c. at least a portion of at least one of said pair of side walls forming a side of said subbase portion;
d. said at least one hollow conduit in fluid communication with one of said at least two ports; and
e. said at least one passageway comprises at least two passageways one of said at least two passageways through each of said pair of side walls and one of said at least two passageways in fluid communication with said at least one hollow conduit and an other of said at least two passageways in fluid communication of at least one other of said at least two ports.

31. The manifold protective valve enclosure of claim 22 wherein said subbase portion comprises an integrally formed raised portion of said bottom portion.

32. The manifold protective valve enclosure of claim 22 wherein said at least one side wall extends beyond said upper surface and extends beyond said valve when mounted thereon.

33. The manifold protective valve enclosure of claim 23 further comprising a hinge between an edge of said cover and said at least one side wall such that said cover is movable between opened and closed positions.

34. The manifold protective valve enclosure of claim 22 further comprising at least one access hole through said at least one side wall for providing electrical access between an electrical connector associated with said valve and an external electrical source.

35. The manifold protective valve enclosure of claim 34 further comprising said subbase portion having at least one electrical receptacle to receive an electrical connector associated with said valve and said at least one access hole providing electrical access between said electrical receptacle and said external electrical source.

36. The manifold protective valve enclosure of claim 34 further comprising a one-piece electrical connector device mounted on said bottom portion within said plurality of side walls and electrically connected to said at least one electrical receptacle and said at least one access hole providing access between an external electrical source and said one-piece electrical connector device.

37. The manifold protective valve enclosure of claim 22 wherein:
said at least one port in said upper surface comprises a plurality of ports each for mating with corresponding valve ports on said valve;
said at least one hollow conduit comprises a plurality of hollow conduits each in fluid communication with one of said plurality of ports; and
said at least one passageway comprises a plurality of passageways each and an inner opening in fluid communication with one of said plurality of conduits.

38. The manifold protective valve enclosure of claim 37 further comprising said upper surface having at least one override port in fluid communication with at least one of said plurality of ports and said at least one override port spaced apart from said plurality of ports such that said override port is accessible to an external connection even with said valve mounted on said upper surface.

39. The manifold protective valve enclosure of claim 37 wherein said plurality of ports comprises at least one supply port and at least one delivery port and at least one exhaust port.

40. The manifold protective valve enclosure of claim 38 wherein at least one of said plurality of ports is an exhaust port and said at least one override port in fluid communication with said exhaust port.

41. The manifold protective valve enclosure of claim 22 further comprising at least one accessory device connected to at least one of said subbase portion and said bottom portion within said at least one side wall.

* * * * *